(12) United States Patent
Knapp (10) Patent No.: US 8,616,781 B2
(45) Date of Patent: Dec. 31, 2013

(54) EXPANDED BEAM OPTICAL CONNECTOR

(75) Inventor: Greyson O. Knapp, Houston, TX (US)

(73) Assignee: Innovative Intellectual Properties LLC, Cypress, TX (US)

( * ) Notice: Subject to any disclaimer, the term of this patent is extended or adjusted under 35 U.S.C. 154(b) by 338 days.

(21) Appl. No.: 12/969,028

(22) Filed: Dec. 15, 2010

(65) Prior Publication Data

US 2012/0155807 A1   Jun. 21, 2012

(51) Int. Cl.
*G02B 6/38* (2006.01)

(52) U.S. Cl.
USPC .............................. 385/61; 385/19

(58) Field of Classification Search
USPC ........................................ 385/61, 19
See application file for complete search history.

(56) References Cited

U.S. PATENT DOCUMENTS

| | | | |
|---|---|---|---|
| 5,039,193 A * | 8/1991 | Snow et al. ................ | 385/25 |
| 5,142,602 A * | 8/1992 | Cabato et al. ............... | 385/87 |
| 5,163,107 A * | 11/1992 | Garriss ........................ | 385/74 |
| 5,588,077 A | 12/1996 | Woodside ................... | 385/26 |
| 5,949,929 A * | 9/1999 | Hamm ........................ | 385/25 |
| 6,168,319 B1 | 1/2001 | Francis | |
| 6,960,028 B2 | 11/2005 | Lampert | |
| 7,031,567 B2 | 4/2006 | Grinderslev et al. | |
| 7,181,106 B2 | 2/2007 | Ushiro et al. | |
| 7,722,261 B2 | 5/2010 | Kadar-Kallen et al. | |
| 7,775,725 B2 * | 8/2010 | Grinderslev ................ | 385/74 |
| 2002/0091321 A1* | 7/2002 | Goldstein et al. ........... | 600/476 |
| 2002/0131699 A1* | 9/2002 | Raguin et al. ............... | 385/33 |
| 2003/0179993 A1* | 9/2003 | Shigenaga et al. .......... | 385/33 |
| 2004/0057664 A1* | 3/2004 | Bolle .......................... | 385/33 |
| 2004/0175073 A1* | 9/2004 | Grinderslev et al. ........ | 385/34 |
| 2006/0140544 A1* | 6/2006 | Morimoto et al. .......... | 385/59 |
| 2006/0245694 A1* | 11/2006 | Chen et al. ................. | 385/71 |
| 2009/0154884 A1* | 6/2009 | Chen et al. ................. | 385/79 |
| 2010/0104244 A1* | 4/2010 | Grinderslev ................ | 385/74 |
| 2011/0198324 A1* | 8/2011 | de Jong et al. ............. | 219/121.72 |
| 2011/0229090 A1* | 9/2011 | Isenhour et al. ............ | 385/78 |
| 2012/0014645 A1* | 1/2012 | Kadar-Kallen .............. | 385/33 |
| 2012/0020618 A1* | 1/2012 | Erdman et al. ............. | 385/33 |
| 2012/0163754 A1* | 6/2012 | Benjamin et al. ........... | 385/33 |

FOREIGN PATENT DOCUMENTS

WO    WO2008109605    12/2008

OTHER PUBLICATIONS

Tyco Electronics, Pro Beam Jr. Expanded Beam (EB) Cable Plug Connectors; Instruction Sheet, 408-10222; (Copyright dated 2008).
RPC Photonics Engineered Diffusers, (Copyright dated 2007) at http://www.rpcphotonics.com/engineered.asp.
Detail Specification Sheet, MIL-DTL-83526/20 (dated Aug. 28, 2008).
Tyco Electronics, Tyco Electronics eDigest; Advances in High Density Optical Interconnects (Copyright dated 2005).
US Conec Ltd., MT Ferrules & MTP Multifiber Single-mode & Multimode Connectors, (Copyright dated 2007).

* cited by examiner

*Primary Examiner* — Kaveh Kianni
(74) *Attorney, Agent, or Firm* — Hovey Williams LLP (57) ABSTRACT

An expanded beam optical connector includes a housing and an expanded beam lens being mounted in the housing. The connector is operable to axially align the expanded beam lens and a terminated optical fiber so that the expanded beam lens is configured to be in optical communication with the optical fiber.

11 Claims, 10 Drawing Sheets

EXPANDED BEAM OPTICAL CONNECTOR

BACKGROUND

1. Field

The present invention relates generally to expanded beam optical connectors. More specifically, embodiments of the present invention concern an expanded beam connector with a gradient index (GRIN) lens.

2. Discussion of Prior Art

Optical connectors have long been used in various applications, such as industrial, military, and telecommunications applications, to interconnect fiber optic cable assemblies. Such connectors are often include mated ferrule-type optical terminations that are positioned in physical contact with one another. Alternatively, traditional optical connectors also include a ball lens arrangement positioned between two terminated fibers so that the terminated fiber ends can optically communicate with one another without being in physical contact.

Conventional optical connectors suffer from numerous limitations. In particular, prior optical connectors are problematic to use in harsh environments, e.g. where connectors are exposed to moisture or other contaminants. For instance, prior art optical connectors normally require careful cleaning prior to mating of the connectors, particularly when connector ends are exposed to contaminants, so that the mated connectors produce minimal insertion and return losses. Cleaning of traditional optical connectors is time-consuming and typically involves cleaning of multiple connector surfaces. In the event that contaminants are present when prior art optical connectors are mated (e.g., because the connectors were not properly cleaned or because contaminants have migrated into the connectors), such connectors also cause excessive insertion and return losses.

SUMMARY

The following brief summary is provided to indicate the nature of the subject matter disclosed herein. While certain aspects of the present invention are described below, the summary is not intended to limit the scope of the present invention.

Embodiments of the present invention provide an expanded beam optical connector that does not suffer from the problems and limitations of the prior art optical connectors set forth above.

A first aspect of the present invention concerns an expanded beam optical connector operable to receive at least one terminated optical fiber. The connector broadly includes a housing, a GRIN lens, and an endless sealing device. The housing presents a passage that extends through the housing. The GRIN lens is mounted in the passage and is operable to be substantially axially aligned with the fiber end so that the GRIN lens is configured to be in optical communication with the optical fiber. The GRIN lens presents lens ends and an endlessly extending outer lens surface that extends between the ends. The endless sealing device extends endlessly around and sealingly engages the lens surface. The endless sealing device is positioned within the passage and is in sealing engagement with the housing, with the endless sealing device thereby providing a substantially hermetic seal between the GRIN lens and housing.

A second aspect of the present invention concerns an expanded beam optical connector operable to receive multiple terminated optical fibers. The connector broadly includes a housing, an optical ferrule, and a plurality of GRIN lenses. The housing presents a passage that extends through the housing. The optical ferrule presents an end-face and multiple fiber openings that intersect the end-face and are operable to receive respective fiber ends of the multiple terminated optical fibers. The optical ferrule is mounted in the passage. The plurality of GRIN lenses are mounted in the passage. The plurality of GRIN lenses are substantially axially aligned with corresponding fiber openings so that the plurality of GRIN lenses and corresponding optical fibers are configured to be in optical communication with one another. The plurality of GRIN lenses are in abutting engagement with the end-face.

A third aspect of the present invention concerns an optical connector assembly configured to optically interconnect terminated optical fibers. The optical connector assembly broadly includes first and second connectors. The first and second connectors are removably attached to one another in a mated condition to provide optical interconnection therebetween. Each of the connectors includes a housing, an optical ferrule, and an expanded beam lens. The optical ferrules each present an end-face and multiple fiber openings that intersect the end-face and are operable to receive respective fiber ends of the terminated optical fibers. The expanded beam lenses are substantially axially aligned with corresponding fiber openings so that the expanded beam lenses and corresponding optical fibers are configured to be in optical communication with one another. The expanded beam lens of one of the connectors comprises a GRIN lens. The expanded beam lens of the other of the connectors comprises a ball lens. The lenses are in optical communication with one another in the mated condition. A first one of the lenses is configured to direct a light beam from the corresponding optical fiber to a space between the lenses, with the first lens being dimensioned so that the light beam passing into the space is collimated and has a predetermined beam diameter. A second one of the lenses is configured to direct the collimated light beam from the space to the respective optical fiber, with the second lens being dimensioned to focus the collimated light beam with the predetermined beam diameter onto the respective optical fiber.

A fourth aspect of the present invention concerns a method of manufacturing an expanded beam connector with a housing and an expanded beam lens secured within a bore in the housing. The method broadly includes the steps of applying an endless metallic layer onto an endless surface of an expanded beam lens and/or the bore; positioning the expanded beam lens within the bore; and heating the metallic layer so as to form an endless hermetic solder joint between the expanded beam lens and housing.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
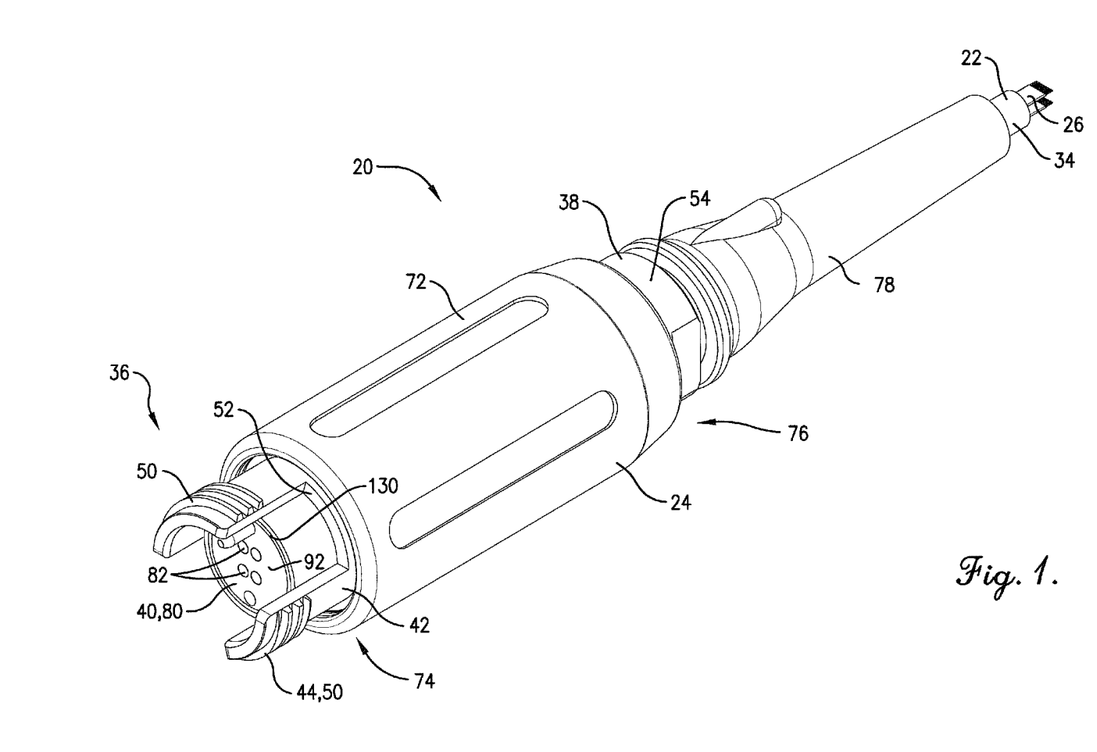
FIG. 1 is a fragmentary perspective of a connectable cable assembly constructed in accordance with a first embodiment of the present invention, with the connectable cable assembly including a connector assembly and a jacketed cable assembly terminated by the connector assembly.

Turning initially to FIG. 1, a connectable cable assembly 20 is constructed to transport optical signals over long distances for various applications, such as military, telecommunications, or industrial applications. The illustrated cable assembly 20 is particularly suited for use in harsh environments, e.g., where the cable assembly is exposed to contaminants (such as moisture, oil, or dirt), extreme temperature, and/or extreme pressure. The connectable cable assembly 20 broadly includes a jacketed cable assembly 22 and a connector assembly 24.

Turning to FIGS. 1-5, the jacketed cable assembly 22 is conventional and includes a pair of optical ribbon cables 26 each having a plurality of optical fibers 28 within a jacket 30. The illustrated cables 26 each preferably include twelve (12) fibers 28, although a smaller or greater number of fibers could be incorporated into the cable 26. The illustrated fibers 28 are conventional single-mode fibers and each include a glass fiber core 32 and a cladding layer (not shown) that surrounds the core 32. However, the principles of the present invention are applicable where the cable assembly 22 includes multi-mode fibers.

The jacketed cable assembly 22 further includes an insulating jacket 34 that surrounds the ribbon cables 26. Preferably, the jacket 34 includes a synthetic resin material extruded over the ribbon cables 26. While the illustrated cable assembly 22 preferably only includes optical fibers within the jacket 34, it is also within the scope of the present invention where additional components are provided in cable assembly 22. For instance, the cable assembly 22 could include one or more electrical wires within the jacket 34 so that the cable assembly 22 is operable to transmit optical and electrical signals. Also, the cable assembly 22 could include other types of elongated members (e.g., a non-conductive strength member designed to carry tensile loads through the cable) within the jacket 34. While a small portion of the entire cable length is depicted, the cable assembly 22 could have a length dimension that ranges from a few feet to thousands of feet. While the illustrated cable includes jacket 34, it is also within the scope of the present invention where cable assembly 22 has no jacket. For instance, the fibers could be secured to one another as part of an alternative harness arrangement.

Figure 2:
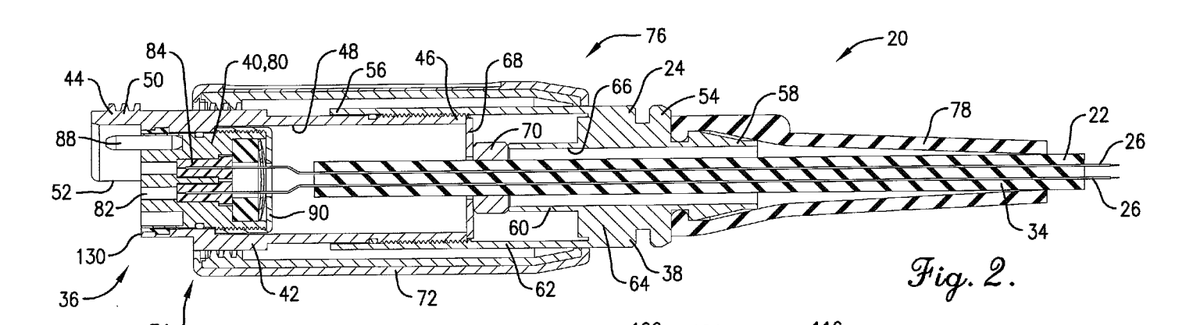
FIG. 2 is a fragmentary cross section of the connectable cable assembly shown in FIG. 1, showing a connector housing assembly and an insert assembly of the connector assembly, with the connector housing assembly including a connector housing, an extension secured to the connector housing, a boot secured to the extension, and a coupling nut rotatably received by the connector housing and extension.
Figure 2A:
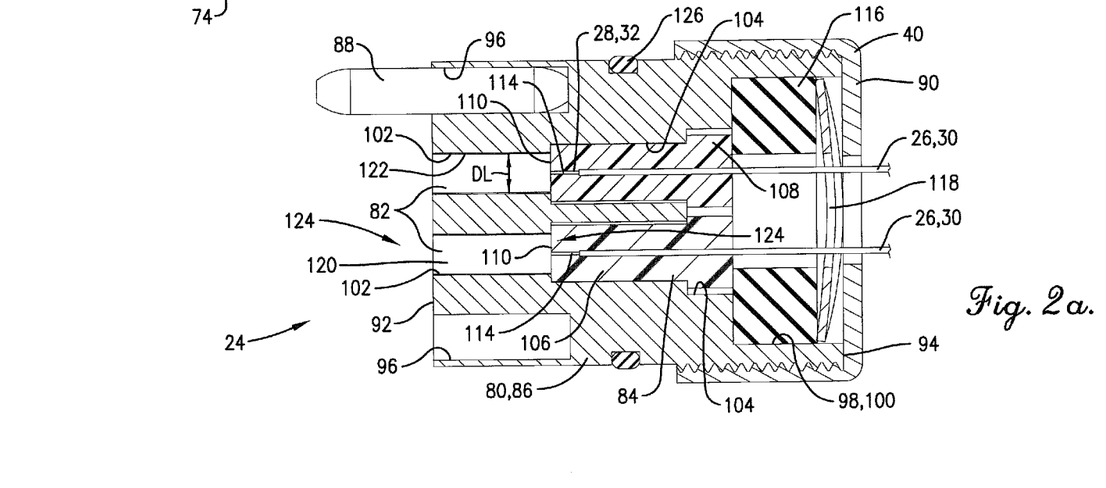
FIG. 2a is an enlarged fragmentary cross section of the connectable cable assembly shown in FIGS. 1 and 2, with the insert assembly including an insert housing, GRIN lenses secured in the housing, ferrule connectors removably mounted in the housing and held therein by a spring, seal, and threaded cap, and an alignment pin.
Figure 3:
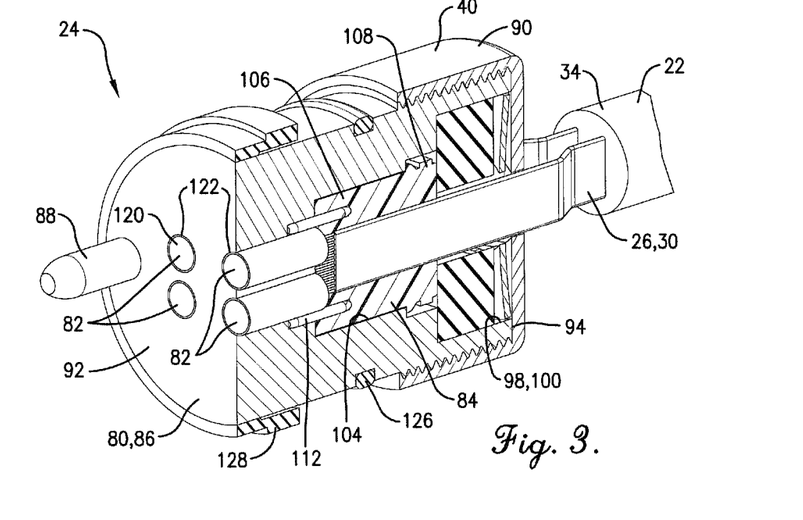
FIG. 3 is a fragmentary front perspective of the connectable cable assembly shown in FIGS. 1-2a, with the insert assembly being cross sectioned to show a proximal end of the insert assembly, and showing one of the ferrule connectors positioned adjacent to two of the GRIN lenses.
Figure 4:
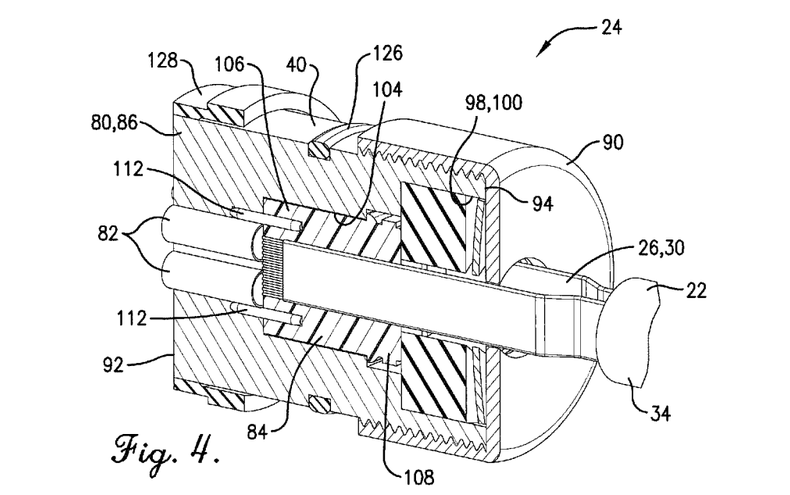
FIG. 4 is a fragmentary rear perspective of the connectable cable assembly shown in FIGS. 1-3, showing a distal end of the insert assembly, with the jacketed cable assembly extending into and out of the insert assembly.

Turning to FIGS. 2-4, the connector assembly 24 is configured to terminate the jacketed cable assembly 22 at a proximal end thereof so that the cable assembly 22 can be releasably connected to another cable assembly. Thus, the connector assembly 24 provides an optical connection that serves to transmit optical signals to and from the cable assembly 22 when attached to another connector. Furthermore, the connector assembly 24 provides a mechanical connection that serves to transmit tensile forces to and from the cable assembly 22. As will be discussed, the illustrated connector assembly 24 presents a proximal connection end 36 that can be mated with the connection end of another connector. Preferably, the connector assembly 24 is configured as an hermaphroditic connector. That is, the proximal connection end 36 is configured so that the connector assembly 24 can be releasably connected with an identical connector assembly 24 (see FIGS. 6 and 7). However, the principles of the present invention are applicable where the connector assembly 24 comprises either a male or female connector. The connector assembly 24 preferably includes a connector housing assembly 38 and an insert assembly 40.

The connector housing assembly 38 is configured for securement to the cable assembly and to support the insert assembly 40 for connection to the cable assembly. The connector housing assembly 38 includes a generally cylindrical housing 42 that presents a threaded proximal end 44, a threaded distal end 46, and a bore 48 extending between the ends 44,46. The housing 42 includes a pair of arcuate threaded prongs 50 that project proximally from the rest of the housing 42, with notches 52 being defined between the prongs 50. Preferably, the prongs 50 are configured so that the housing 42 provides an hermaphroditic connector end, such that prongs 50 of two mated housings 42 are intercalated with one another (see FIGS. 6 and 7). However, the principles of the present invention are applicable where the housing 42 is configured for use as part of a male or female connector.

The connector housing assembly 38 also includes a cylindrical extension 54 with an internally threaded proximal end 56 and a distal end 58. The extension 54 has inner and outer sleeves 60,62 interconnected by a transverse wall 64 and a central bore 66 that extends between the ends 56,58. The proximal end 56 of extension 54 is operable to be threaded onto the distal end 46 of housing 42. The connector housing assembly 38 further includes a washer 68 that engages the distal end 46 of housing 42 and a seal 70 captured between the washer 68 and the inner sleeve 60.

The connector housing assembly 38 further includes a generally cylindrical coupling nut 72 with a threaded proximal end 74 and a tapered distal end 76. The coupling nut 72 is slidably received on the housing 42 and extension 54 by inserting the distal end 58 of extension 54 through the proximal end 74 of the coupling nut 72. As will be discussed, the illustrated coupling nut 72 is operable to be threaded onto an identical connector housing assembly 38, although the nut 72 could be configured to secure the housing assembly 38 to a connector housing with a different construction. The illustrated connector housing assembly 38 is preferably a PRO BEAM Jr.® connector manufactured by Tyco Electronics Ltd. However, the principles of the present invention are applicable where another connector housing is incorporated into the illustrated connector assembly. While the connector housing assembly 38 is designed to be freely moveable, it is also within the ambit of the present invention where an alternative housing assembly is constructed in the form of a bulkhead connector. That is, the connector housing assembly 38 could be constructed to include a flange that allows the housing to be fixed to a bulkhead (not shown).

A proximal end of the jacketed cable assembly 22 is secured to the connector housing assembly 38 by inserting the proximal cable end through a strain relief boot 78 of the connector housing assembly 38. The strain relief boot 78 is mounted on the cable assembly 22 and secured about the distal end 58 of extension 54. The proximal cable end is then inserted through bores 48,66 of the housing 42 and extension 54. The washer 68 and seal 70 are also shifted onto the cable assembly 22, with the seal 70 positioned in sealing engagement with the jacket 34.

Figures 6, 7:
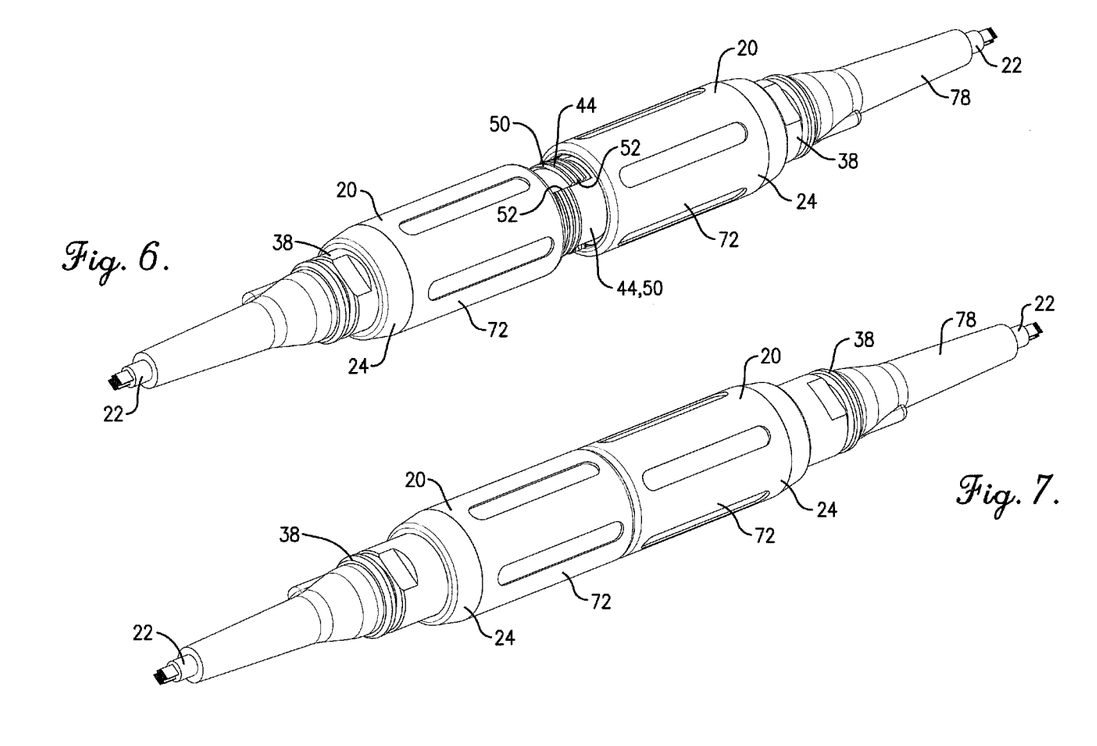
FIG. 6 is a perspective of a pair of connectable cable assemblies as shown in FIGS. 1-5b, showing the connector assemblies in a mated condition, with the connector housings each including threaded prongs that are intercalated with prongs of the other connector housing, and with the coupling nuts disengaged from corresponding prongs.
FIG. 7 is a perspective of the pair of connectable cable assemblies similar to FIG. 6, but showing the coupling nuts in threaded engagement with corresponding prongs.
Figures 8, 9:
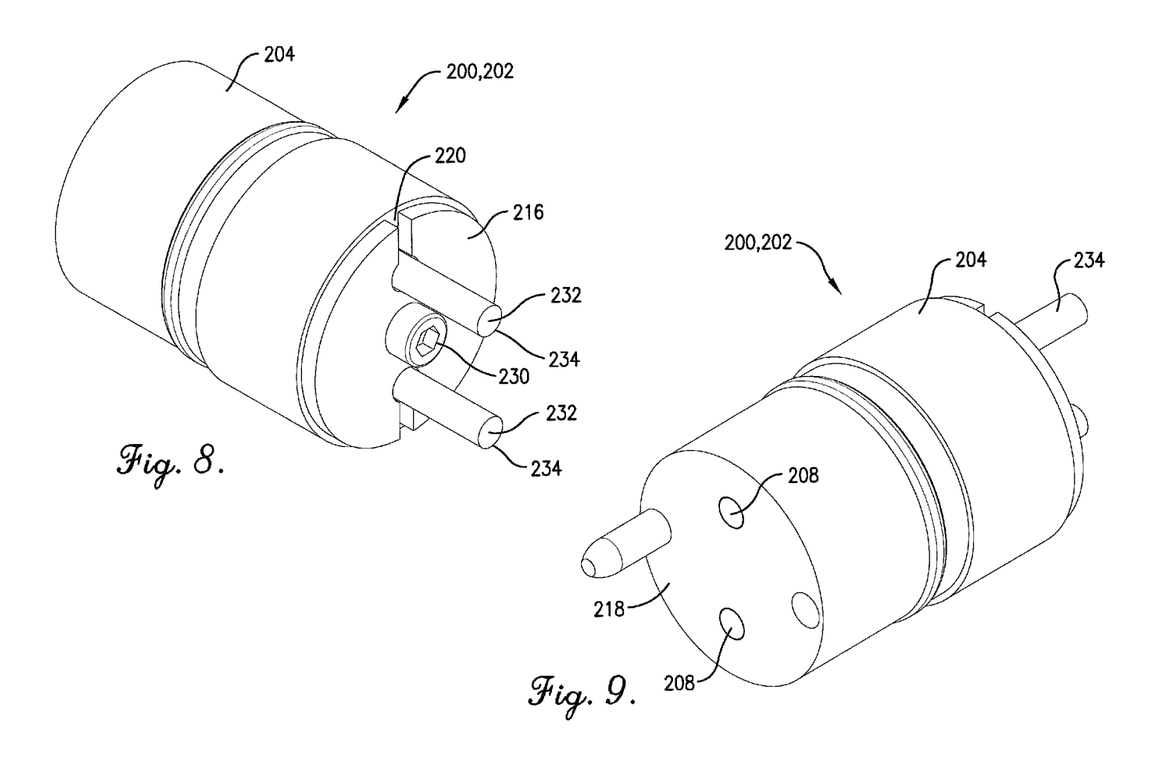
FIG. 8 is a fragmentary rear perspective of a connectable cable assembly constructed in accordance with a second embodiment of the present invention, showing an insert assembly that terminates a cable assembly.
FIG. 9 is a fragmentary front perspective the connectable cable assembly shown in FIG. 8, showing a proximal end of the insert assembly, with the insert assembly including a housing, a pair of GRIN lenses secured in the housing, and an alignment pin that projects from a proximal face of the housing.
Figure 10:
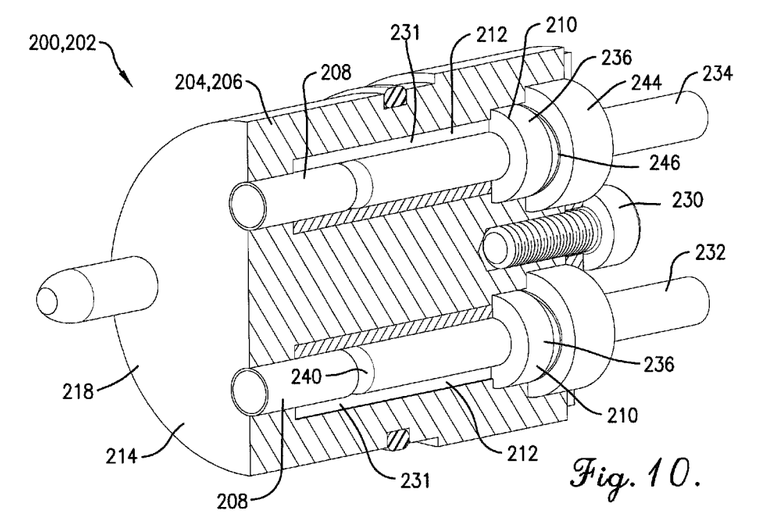
FIG. 10 is a fragmentary front perspective of connectable cable assembly similar to FIG. 9, but showing the insert housing cross sectioned to show ferrule connectors and alignment sleeves of the insert assembly, with the alignment sleeves mounted in the housing so that GRIN lenses and ferrule connectors are aligned by corresponding sleeves, and with the ferrule connectors being secured in the housing by a fastener.

Turning to FIGS. 6 and 7, the connector housing assembly 38a can be removably attached to another connector housing assembly 38b. First, the illustrated prongs 50 of one housing 42 are inserted into corresponding notches 52 of the other housing 42. The housings 42 are then secured to one another by threading each of the coupling nuts 72 onto the threaded proximal end 44 of the opposite housing 42 until the proximal ends 74 of coupling nuts 72 engage one another. Again, the principles of the present invention are equally applicable where housing assembly 38 is mated with a different connector housing. The connector housing assembly 38 is preferably formed of a metallic material, such as aluminum or stainless steel. However, it is also within the ambit of the present invention where the housing assembly 38 includes another material, such as a synthetic resin.

Turning again to FIGS. 2-4, the illustrated insert assembly 40 serves to support and position optical fibers 28 in one or more optical ferrule connectors. The insert assembly 40 preferably includes an insert housing 80, gradient index lenses 82 (i.e., GRIN lenses 82), and optical ferrule connectors 84. As will be discussed, the lenses 82 and ferrule connectors are secured within the insert housing 80. The insert housing 80 includes a body 86, an alignment pin 88 inserted in the body 86, and a cap 90. The illustrated body 86 is generally cylindrical and presents proximal and distal faces 92,94. The body 86 also presents an outer surface that extends from the proximal face 92 to the distal face 94. The outer surface is threaded adjacent the distal face 94 and includes an O-ring gland spaced between the faces 92,94. Alignment bores 96 project axially from the proximal face 92 (see FIG. 2a).

The body 86 also presents a passage 98 that projects axially from the proximal face 92 to the distal face 94. The passage 98 is formed by a distal socket 100 that extends proximally from the distal face 94, a plurality of proximal lens sockets 102 that extend distally from the proximal face 92, and ferrule sockets 104 that extend between the distal socket 100 and the lens socket 102.

The alignment pin 88 is generally cylindrical and is inserted into one of the alignment bores 96. The cap 90 includes an internally threaded rim that extends endlessly about a central opening. The cap 90 is threaded onto the body 86 to secure the ferrule connectors 84 within the body 86, as will be discussed. The illustrated insert housing 80 is preferably constructed to be used as part of an hermaphroditic connector, although the principles of the present invention are applicable where the insert housing 80 is incorporated into a male or female connector. The insert housing 80 is preferably formed of a metallic material, such as stainless steel.

The optical ferrule connectors 84 are used to terminate the optical fibers 28 of cable assembly 22. Each optical ferrule connector 84 includes a ferrule 106 and a base 108. The illustrated ferrule connector 84 preferably presents a proximal end-face 110 with a generally rectangular shape, with the end-face 110 including opposite end margins 110a. The ferrule connector 84 also includes alignment pins 112 that are secured to the ferrule 106 and project from the end-face 110. The ferrule connector 84 preferably presents twelve (12) fiber openings 114 spaced from one another and positioned along a line between the alignment pins 112. However, the principles of the present invention are applicable where the ferrule connector 84 has an alternative number and/or arrangement of fiber openings. The illustrated optical ferrule connector 84 preferably comprises an MT ferrule manufactured by US Conec Ltd. of Hickory, N.C. Again, the ferrule connector 84 could be alternatively configured for some aspects of the present invention. For instance, as will be shown in a subsequent embodiment, the ferrule connector could be alternatively sized and/or shaped. The connector assembly 24 could also have an alternative number of ferrule connectors. Furthermore, the connector assembly 24 could also utilize a prepolished MT ferrule (or another type of prepolished optical ferrule such as a prepolished single fiber ferrule) that is preinstalled in the housing 80 as an assembly (e.g., to promote efficient optical termination).

The optical fibers 28 are terminated in corresponding ferrule connectors 84 using conventional fiber termination procedures (e.g., by cleaving the fiber 28 and polishing of the fiber 28 and ferrule 106). The ferrule connector 84 and terminated fiber 28 are secured in the body 86 by inserting the proximal end of ferrule 106 though the distal socket 100 and into corresponding ferrule sockets 104. The ferrules 106 are generally seated by positioning the end-face 110 adjacent a shoulder at the proximal end of ferrule socket 104. Furthermore, a shoulder of the ferrule connector 84 engages another shoulder adjacent the distal end of ferrule socket 104. The ferrule connectors 84 are held within the body 86 by inserting a spacer 116 and spring 118 within the distal socket 100 so that the spacer 116 engages the ferrule base 108. Thus, the spring 118 is positioned and compressed between the spacer 116 and cap 90. In this manner, the ferrule connector 84 is resiliently urged by the spring 118 toward the proximal connection end 36 so that each of the ferrules 106 is urged into abutting engagement with the corresponding GRIN lenses 82 (or alternative optical element). However, the spring could also be used to urge the ferrule connector 84 into a predetermined position where a working distance (i.e., back focal length) greater than zero is defined between the ferrule and the GRIN lens (or alternative optical element).

Turning to FIGS. 3, 4, 5, and 5b, the GRIN lenses 82 are configured to transmit optical signals to and from corresponding optical fibers 28. The lenses 82 each preferably include a conventional GRIN lens element 120 and a metallic layer 122 applied to and in sealing engagement with the lens element 120 (see FIG. 3). The GRIN lens 82 is conventional in that the lens 82 is operable to de-focus and collimate a light beam so that the collimated beam has a predetermined beam diameter. Alternatively, the lens 82 can be used to focus a collimated light beam having a beam diameter. Thus, the GRIN lens 82 presents opposite ends 124, with one of the ends 124 being configured to receive a focused beam from an optical fiber or transmit the focused beam into the optical fiber. The other end 124 is configured to receive a collimated beam or transmit the collimated beam.

The GRIN lens 82 also presents a cylindrical outer surface extending between the ends 124. The lens 82 preferably presents a lens diameter dimension DL of about 1.8 mm (see FIG. 2a). However, a lens with an alternative lens dimension (e.g., a 1 mm or 0.5 mm diameter lens) could be utilized. The illustrated ends 124 preferably have a flat polish face, although an end could have an angle polished face. The metallic layer 122 is applied to the cylindrical outer surface. Preferably, the metallic layer 122 includes gold, silver, and/or indium alloy. However, it is also within the ambit of the present invention where the metallic layer 122 includes other materials (e.g., another material suitable for soldering or alternative sealing of the GRIN lens 82 within the housing). The illustrated lenses 82 are preferably manufactured by NSG America, Inc., Somerset, N.J.

The lenses 82 are secured within the body 86 by inserting each lens 82 into a corresponding lens socket 102, with the collimation end 124 of the lens 82 being exposed to ambient. The lenses 82 are preferably positioned so that a proximal face presented by the collimation end is substantially flush with the proximal face 92 of the body 86. The lenses 82 are preferably held in place by soldering the metallic layer 122 to the body. In particular, the metallic layer 122 is preferably soldered, e.g., by induction heating the layer with an inductive heating device (not shown), so that the layer 122 becomes welded to the surface that defines the lens socket 102. While the layer is preferably heated by the inductive heating device, other conventional soldering devices, such as a soldering gun, could be used to heat the layer. In this manner, the lenses 82 are secured within the body 86. Moreover, the metallic layer 122 sealingly engages the lens element 120 and the body 86 to provide an hermetic seal between the body 86 and the corresponding lens 82. However, for some aspects of the present invention, an alternative sealing mechanism could be used. For instance, an additional solder layer could be introduced between metallic layer 122 and body 86 to solder the metallic layer 122 to the body 86. For some aspects of the present invention, another type of sealing mechanism, such as an O-ring seal, could be incorporated between the lens 82 and body 86. Also, an adhesive layer could be added between the layer 122 and body 86 to provide sealing engagement. Heat-activated adhesives, such as epoxy adhesive, provide one suitable alternative for securing the GRIN lens 82. For this alternative, once the GRIN lens 82 is positioned within the housing and the heat-activated adhesive is applied in the interstitial space between the GRIN lens 82 and housing, heat can be applied (e.g., by inductive heating) to cure the adhesive and thereby secure one or more of the GRIN lenses 82. While inductive heating using the inductive heating device is preferably used to cure the adhesive, other devices could be employed to cure the adhesive.

Turning to FIG. 2a, the illustrated construction of the insert assembly 40 preferably positions the lenses 82 relative to the fiber openings 114 and fibers 28 so that each lens 82 properly de-focuses light transmitted from the fiber end or focuses light transmitted into the fiber end. Thus, each lens 82 and fiber end cooperatively define a working distance therebetween. In the illustrated embodiment, the working distance is zero length. However, it is also within the scope of the present invention where the lens 82 and fiber end define a working distance greater than zero.

Figures 5, 5A, 5B:
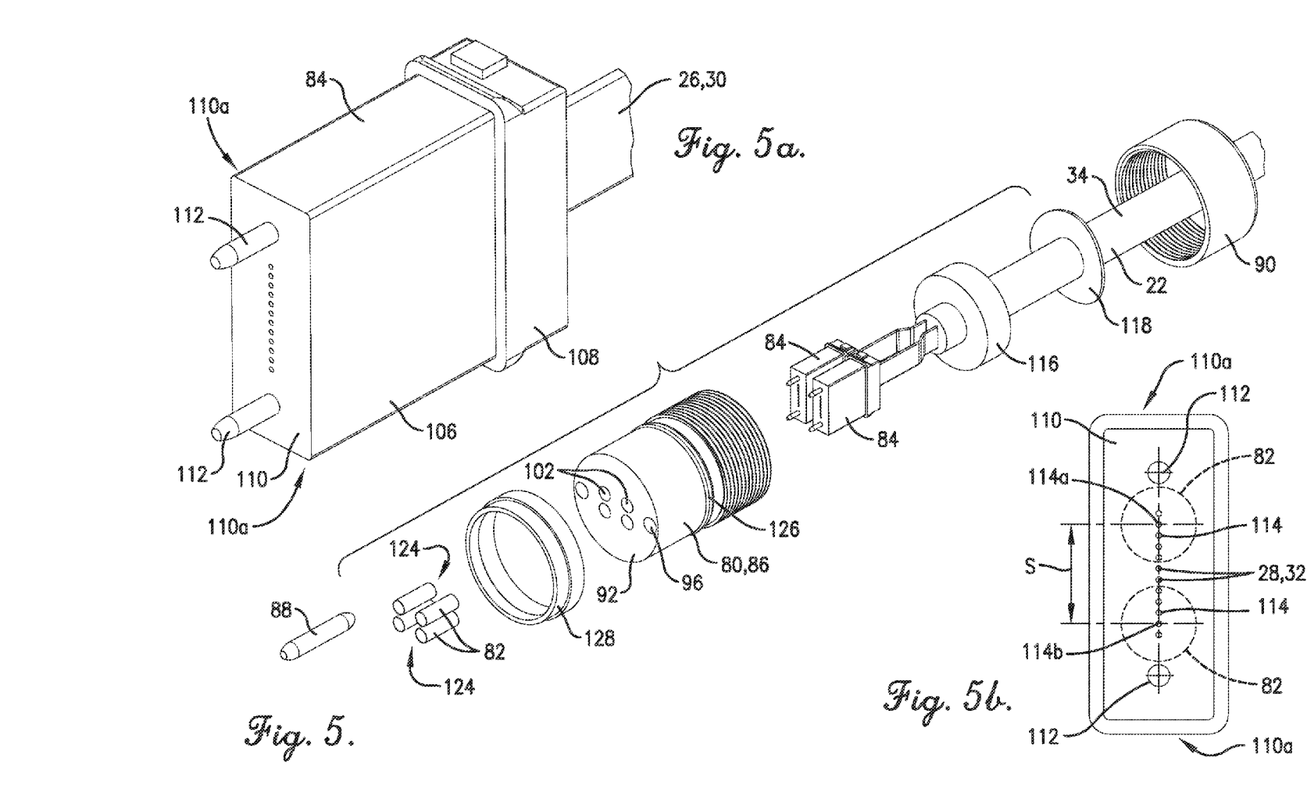
FIG. 5 is a fragmentary exploded view of the connectable cable assembly shown in FIGS. 1-4; showing components of the insert assembly exploded from the ferrule connectors and jacketed cable assembly.
FIG. 5a is a greatly enlarged fragmentary perspective of the connectable cable assembly shown in FIGS. 1-5, showing an optical ribbon cable of the jacketed cable assembly terminated by one of the ferrule connectors, with the ferrule connector including a ferrule, a body, and alignment pins that project from an end-face of the ferrule; and with the ferrule presenting multiple fiber openings that intersect the end-face and are spaced between the alignment pins.
FIG. 5b is a greatly enlarged front elevation of the ferrule connector shown in FIG. 5a, showing the position of the alignment pins and fiber openings along the end-face, and further showing the position of corresponding GRIN lenses relative to the fiber openings.

Turning to FIG. 5b, the illustrated insert construction positions the lenses 82 into alignment with corresponding fiber openings 114a,b and fibers 28, where the fiber openings 114a,b preferably have a center-to-center spacing S of about 2.25 mm. In particular, the lenses 82 are positioned in substantially axial alignment with respective fiber openings 114a,b and corresponding fibers 28. However, for some aspects of the present invention, the lenses 82 and/or fibers 28 could be alternatively configured to provide an alternative number of optical channels. For instance, lens 82 could present a smaller lens diameter dimension (e.g., a 1 mm or 0.5 mm diameter lens) so that a greater number of lenses 82 can be positioned along the ferrule end-face 110.

The illustrated insert assembly 40 is preferably constructed to provide optical interconnection between cable assembly 22 and another cable assembly. However, it is also within the scope of the present invention where the insert assembly 40 also includes other components (e.g., electrical contacts, pins, and/or related structures to provide electrical interconnection).

The insert assembly 40 is secured within the connector housing assembly 38 by sliding the insert assembly 40 through the distal end 46 of housing 42. An O-ring seal 126 is inserted in the gland presented by the outer surface of the insert housing 80. An annular seal 128 is positioned in a gland defined adjacent proximal end 44 of housing 42 and positioned between housings 42,80. Preferably, the insert assembly 40 is positioned so that the proximal face 92 is substantially flush with a face 130 of the housing 42 (see FIGS. 1 and 2).

The illustrated connector assembly 24 is preferably constructed so as to satisfy specifications recited in military specification MIL-DTL-83526/20, entitled CONNECTOR, FIBER OPTIC PLUG, CIRCULAR HERMAPHRODITIC, IN-LINE MOUNT, 2 AND 4 POSITIONS, EXPANDED BEAM, dated Jan. 11, 2010, which is hereby incorporated in its entirety by reference herein. However, the principles of the present invention are applicable where the connector assembly 24 falls outside of these requirements. The connector assembly 24 also preferably satisfies certain performance requirements for various light wavelengths. More preferably, the illustrated connector assembly 24 accommodates wavelengths of 1310 nm for single-mode fiber and 1300 nm for multi-mode fiber. Preferably, the connector assembly 24 achieves an optical insertion loss of less than about one (1) dB and an optical back reflection of greater than about 35 dB.

Turning again to FIGS. 6 and 7, a pair of connector assemblies 24 can be releasably mated with one another to provide optical signal transmission between a corresponding pair of cable assemblies 22. As the prongs 50 of each housing 42 are intercalated with prongs 50 of the other housing 42, alignment pins 88 of each insert assembly 40 are received by corresponding bores 96 of the other insert assembly 40. Preferably, the illustrated connector assemblies 24 are positioned in a mated condition by shifting the connector assemblies toward each other so that the proximal faces 92 are positioned immediately adjacent to one another. More preferably, in the mated condition, the faces 92 are positioned so that a small gap is defined therebetween and, most preferably, the gap has a gap dimension of less than about one (1) millimeter. However, the principles of the present invention are applicable where the proximal faces 92 contact one another in the mated condition. In the mated condition, the connector assemblies 24 are held in place by threading the coupling nuts 72 onto corresponding housings 42. As discussed above, each coupling nut 72 threadably engages the prongs 50 of the other connector housing assembly 38.

Preferably, the connector housing assembly 38 and insert assembly 40 cooperatively provide an hermaphroditic connector so that two identical connector assemblies 24 can be mated with each other. However, for some aspects of the present invention, the mated connector assemblies could be structurally different from one another. For instance, the connector assemblies could include male and female connectors. As will be shown in a subsequent embodiment, the connectors could have different lens and/or ferrule components.

In manufacturing the cable assembly, the lenses 82 are secured within the insert housing 80, with the collimation end 124 facing outwardly from the connector. The lenses 82 are initially positioned within corresponding lens sockets 102. The lenses 82 are then secured by attaching (e.g., by soldering) the metallic outer layer 122 of the lens 82 to the adjacent wall surface that defines the socket 102.

The cable assembly 22 is then terminated with the connector assembly 24. The cable assembly 22 is inserted through the distal end 58 of the extension 54, the seal 70, and the washer 68. The optical fibers 28 are terminated in corresponding ferrule connectors 84 using conventional termination procedures. The ferrule connectors 84 are positioned in corresponding sockets 104 of the insert housing 80 and are secured by the spacer 116, spring 118, and cap 90. The insert housing 80 and ferrule connectors 84 are inserted through the distal end 46 of the housing 42. The housing 42 and extension 54 are threadably connected with one another.

Turning to FIGS. 8-17, alternative preferred embodiments of the present invention are depicted. For the sake of brevity, the remaining description will focus primarily on the differences of these alternative embodiments from the preferred embodiment described above.

Initially turning to FIG. 8-11, an alternative connectable cable assembly 200 is constructed in accordance with a second embodiment of the present invention. The connectable cable assembly 200 includes an alternative connector assembly 202 with a connector housing assembly (not shown) and an alternative insert assembly 204. The insert assembly 204 includes an insert housing 206, GRIN lenses 208, optical ferrule connectors 210, and alignment sleeves 212. As will be discussed, the lenses 208 and ferrule connectors 210 are secured within the insert housing 206. The insert housing 206 includes, among other things, a body 214 and a cap 216. The body 214 is generally cylindrical and presents proximal and distal faces 218,220.

Figure 11:
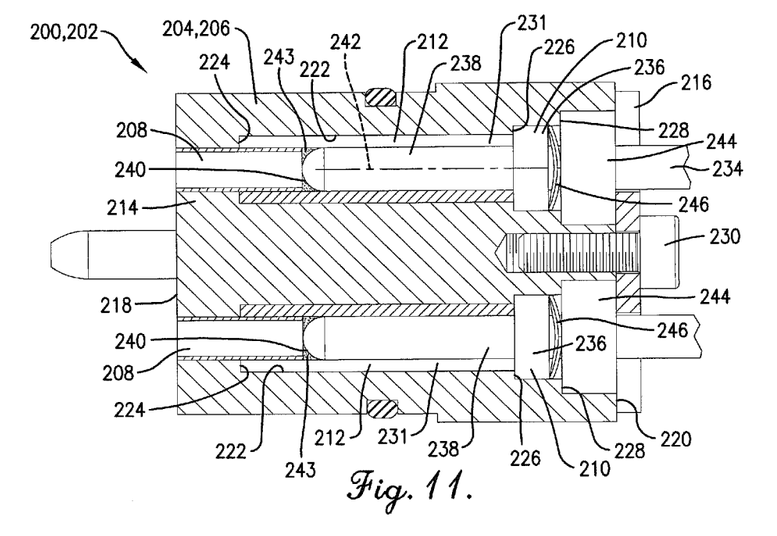
FIG. 11 is a fragmentary cross section of the connectable cable assembly shown in FIGS. 8-10.

The body 214 presents a pair of passages 222 that project axially from the proximal face 218 to the distal face 220 (see FIG. 11). Each passage 222 is defined by shoulders 224,226, 228. The cap 216 comprises a flat plate with openings to receive corresponding optical fiber cables. The cap 216 is secured with a fastener 230 threaded into the body 214.

The alignment sleeves 212 preferably comprise unitary cylindrical sleeves formed with a longitudinal slit 231 extending continuously from one end to the other end. The sleeves 212 are preferably formed of a resilient metallic material, such as beryllium copper or brass. The sleeve 212 preferably presents an inner diameter dimension that is slightly smaller than the outer lens diameter dimension and the outer ferrule diameter dimension. Thus, the slit 231 and sleeve material cooperatively permit the sleeve 212 to expand when receiving the corresponding lens 208 and ferrule connector 210. In receiving the lens 208 and connector 210, the sleeve 212 preferably applies compressive pressure to align the lens 208 and connector 210. The sleeves 212 are inserted into corresponding passages 222, with a proximal end of the sleeve 212 positioned adjacent the shoulder 224.

It is also within the scope of the present invention where the sleeve 212 includes another material so that the sleeve 212 is configured to suitably align the lens 208 and connector 210. For instance, the sleeve 212 could include steel, ceramic, phosphor bronze, or a shape memory alloy material (such as Nitinol). By including certain materials, particularly the shape memory alloy material, the sleeve 212 can be selectively heated or cooled to correspondingly grab or release the lens 208 and ferrule connector 210.

The alternative optical ferrule connectors 210 are used to terminate the optical fibers 232 of fiber cables 234. The ferrule connectors 210 each include a base with a collar 236 and a generally cylindrical ferrule 238 with a rounded end-face 240. The ferrule connector 210 presents a single, centrally positioned, fiber opening 242 (see FIG. 11).

The ferrule connectors 210 and terminated fibers 232 are secured in the body 214 by inserting the proximal end of ferrules 238 though the distal end of passages 222, with the collar 236 positioned adjacent the shoulder 226. Furthermore, the proximal ferrule end is inserted into the distal end of corresponding alignment sleeve 212. In the illustrated embodiment, optical index matching fluid 243 is preferably applied between the endface 240 and the lens 208 to improve optical transmission. The ferrule connectors 210 are held within the body 214 by inserting a spacer 244 and spring 246 adjacent the distal face 220 so that the spring 246 is positioned and compressed between the spacer 244 and collar 236. Thus, the ferrule connector 210 is resiliently urged by the spring 246 toward the proximal connection end so that each of the ferrule 238 is urged into abutting engagement with (or into another predetermined working distance relative to) the corresponding GRIN lens 208.

The GRIN lenses 208 include a lens element and a metallic layer. The lenses 208 are secured within the body 214 by inserting each lens 208 into a proximal end of the corresponding passage 222. The lenses 208 are each further inserted into the proximal end of a respective alignment sleeve 212. The lenses 208 are preferably positioned so that a proximal face thereof is substantially flush with the proximal face 218 of the body 214. As with the previous embodiment, the lenses 208 are held in place by attaching (e.g., by soldering) the metallic layer to the body 214. Preferably, the layer becomes hermetically attached to the body 214 between the proximal face 218 and the shoulder 224. In addition, the lens 208 could become attached (e.g. by solder or adhesive) to the sleeve 212 and/or to the portion of body 214 extending between the shoulders 224,226 (e.g., where solder (or adhesive) flows through the slit 231 and into contact with the body 214). Thus, an endless hermetic seal is formed between the lens 208 and the sleeve 212, and another endless hermetic seal is formed between the sleeve 212 and the body 214. Again, the layer preferably provides an hermetic seal between the body 214 and the corresponding lens element.

Similar to the previous embodiment, the illustrated insert assembly 204 preferably positions the lenses 208 relative to the fiber openings 242 and optical fibers 232 so that each lens 208 properly de-focuses light transmitted from the fiber end or focuses light transmitted into the fiber end. Thus, each lens 208 and fiber end cooperatively define a working distance therebetween, and the working distance is preferably zero length. The illustrated insert construction, including the alignment sleeves 212, preferably positions the lenses 208 into axial alignment with corresponding fiber openings 242 and fibers 232. The illustrated sleeve arrangement preferably allows tuning of the lens 208 and ferrule 238 by permitting relative rotation of the lens 208 and ferrule 238 to optimize optical loss and back reflection. Furthermore, the illustrated construction preferably allows manual adjustments in the working distance to optimize loss and back reflection.

Figure 12:
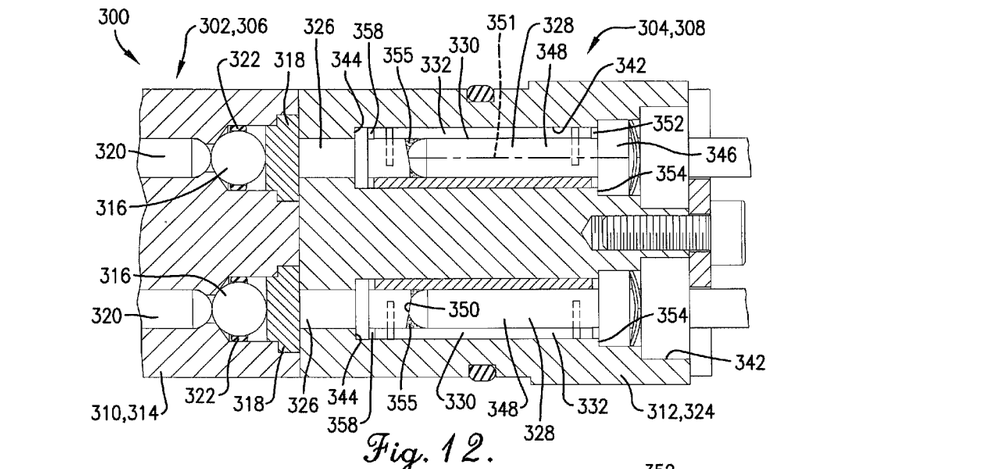
FIG. 12 is a fragmentary cross section of an alternative pair of mated connectable cable assemblies constructed in accordance with a third embodiment of the present invention, with one of the cable assemblies including a ball lens insert assembly and the other cable assembly including a GRIN lens insert assembly, with the GRIN lens insert assembly including a housing, GRIN lenses, ferrule connectors, and alignment sleeves.
Figure 13:
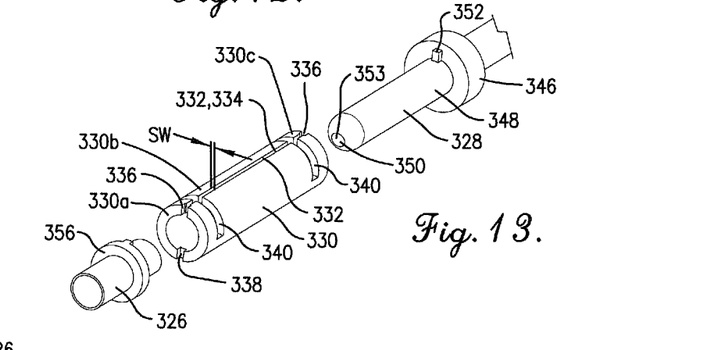
FIG. 13 is a fragmentary front exploded view of the alternative pair of mated connectable cable assemblies shown in FIG. 12, showing a GRIN lens, alignment sleeve, and ferrule connector of the GRIN lens insert assembly, with the GRIN lens and ferrule connector each including key elements and the alignment sleeve including keyways configured to receive corresponding key elements.
Figure 14:
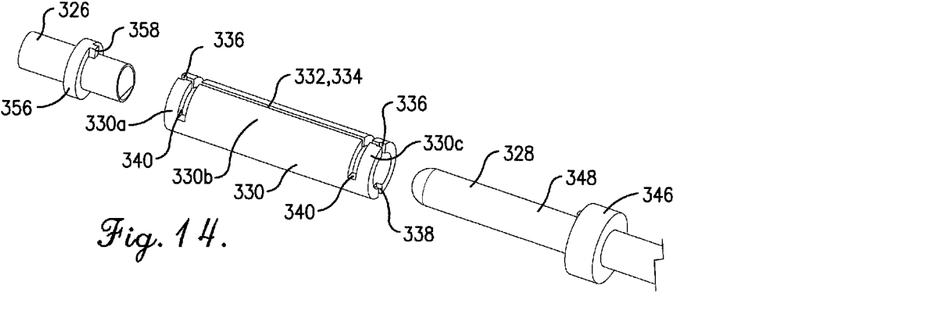
FIG. 14 is a fragmentary rear exploded view of the alternative pair of mated connectable cable assemblies shown in FIG. 13, showing the GRIN lens, alignment sleeve, and ferrule connector depicted in FIG. 13.

Turning to FIGS. 12-14, an alternative mated cable assembly 300 is constructed in accordance with a third embodiment of the present invention. The mated cable assembly 300 includes terminated cable assemblies 302,304 with corresponding expanded beam connector assemblies 306,308. The connector assemblies 306,308 include a connector housing assembly (not shown) and respective ball lens and GRIN lens insert assemblies 310,312. As will be discussed, the connector assemblies 306,308 are mated so that ball lenses optically communicate with respective GRIN lenses.

The ball lens insert assembly 310 includes an insert housing 314, ball lenses 316, lens covers 318, and optical ferrule connectors 320. The ball lenses 316 are preferably secured in corresponding passages with elastomeric seals 322 that provide an hermetic seal between the lens and insert housing. However, it is also within the scope of the present invention where the ball lens 316 includes a metallic layer and is soldered within the passage to provide the hermetic seal.

The GRIN lens insert assembly 312 includes an insert housing 324, GRIN lenses 326, optical ferrule connectors 328, and alternative alignment sleeves 330. The alignment sleeves 330 preferably comprise unitary cylindrical sleeves formed with a longitudinal slit 332 extending continuously from a proximal end of the sleeve 330 to a distal end of the sleeve 330. Furthermore, the slit 332 has a narrow central section 334 and enlarged ends 336, with the slit 332 presenting a slit width dimension SW that is relatively small along the central section 334 and relatively large along the ends 336. However, for some aspects of the present invention, the sleeve 330 could be constructed with a constant slit width along the entire length thereof. Each sleeve 330 further includes end grooves 338 formed at opposite ends of the sleeve 330. The slit ends 336 and end grooves 338 each provide a keyway feature that is configured to receive a corresponding key, as will be discussed.

Each sleeve 330 preferably includes a pair of transverse slots 340 that extend circumferentially along the sleeve 330 and are spaced adjacent to corresponding sleeve ends. The slots 340 separate proximal, intermediate, and distal sections 330a,b,c of the sleeve 330 from one another so that the sleeve sections can each flex radially. Furthermore, the slots 340 separate the sections 330a,b,c to permit independent flexing movement of each section. The sleeves 330 are inserted into corresponding passages 342 of the housing 314, with a proximal end of the sleeve 330 positioned adjacent a respective shoulder 344.

The alternative optical ferrule connectors 320 each include a collar 346 and a generally cylindrical ferrule 348. The connectors 320 present an angle-polished end-face 350 and a fiber opening 351 that intersects the end-face 350. The collar 346 preferably includes an endless body and a key element 352 that projects axially from the body. The alternative optical ferrule connectors 320 are used to terminate optical fibers 353 of the cable assembly.

The ferrule connectors 320 and terminated fibers 345 are secured in the housing 324 by inserting the proximal end of ferrules 348 though the distal end of passages 342, with the collar positioned adjacent a shoulder 354. Furthermore, the proximal ferrule end is inserted into the distal end of corresponding alignment sleeve 330. In the illustrated embodiment, optical index matching fluid 355 is preferably applied between the end-face 240 and the lens 208.

The ferrule 348 is inserted so that the key element 352 is positioned in a slot end 336, although the key element 352 could also be positioned in the corresponding end groove 338. In this manner, the ferrule connector 320 can be rotated relative to the sleeve 330 into a predetermined alignment condition, for purposes discussed below. The principles of the present invention are also applicable where the connector 320 and sleeve 330 include alternative features for relative rotational alignment. For some aspects of the present invention, the connector 320 and sleeve 330 could be devoid of the illustrated keying arrangement while each presents indicia for indicating that the connector 320 and sleeve 330 are in the predetermined alignment condition.

The sleeve 330 has an inner diameter that is slightly undersized relative to the outer diameter of the ferrule 348. Thus, the sleeve 330 is constructed to expand from a relaxed position to receive the ferrule 348, with the sleeve 330 applying a compressive pressure to grab the ferrule 348. In particular, sections 330b,c generally expand to receive and thereby grab the ferrule 348. Furthermore, the distal sections 330c expand to receive and grab the key element 352. It has been found that the use of transverse slots 340 allow the distal sections 330c to expand to a greater degree than the sections 330b.

The GRIN lenses 326 include a GRIN lens element, a metallic layer applied to the lens element, and a lens alignment collar 356. The GRIN lens element includes a flat-polished proximal end (although, for some aspects of the present invention, the proximal end could have a slightly convex shape) and an angle-polished distal end. The collar 356 preferably includes an endless body and a key element 358 that extends axially from the body.

The GRIN lenses 326 are secured within the housing 324 by inserting each lens 326 into a proximal end of the corresponding passage 342. The lenses 326 are each further inserted into the proximal end of a respective alignment sleeve 330. The lenses 326 are positioned so that a proximal face thereof is substantially flush with the proximal face of the housing 324. The lenses are also positioned so that the key element 358 is positioned within a slot end 336, although the key element 358 could also be positioned in the corresponding end groove 338. Similar to the previous embodiments, the lenses 326 are held in place by attaching (e.g., by soldering or adhering) the lens 326 to the housing 324.

The lens 326 can be rotated relative to the sleeve 330 into a predetermined alignment condition. In this condition, the angle-polished face of lens 326 is aligned with the angle-polished end-face 350. The principles of the present invention are also applicable where the lens 326 and sleeve 330 include alternative features for relative rotational alignment. For some aspects of the present invention, the lens 326 and sleeve 330 could be devoid of the illustrated keying arrangement, but each could present indicia for indicating that the lens 326 and sleeve 330 are in the predetermined alignment condition. Thus, the illustrated keying features permit the lens 326 and connector 320 to be rotated relative to one another so as to be positioned in the predetermined alignment condition. Furthermore, the lens 326 and housing 324 include indicia so that the lens 326 can be rotated into a predetermined position, associated with the alignment condition, with the housing 324. In this manner, the connectors 320 can also be located in a predetermined position, associated with the alignment condition, relative to the housing 324. This construction allows angle-polished ferrule connectors 320 of mated connector assemblies to be positioned in optical communication with one another and to be precisely rotationally aligned with each other.

Similar to the reception of ferrule 348 by the sleeve 330, sections 330a,b generally expand to receive and thereby grab the lens 326. Furthermore, the proximal sections 330a expand to receive and grab the key element 358 of lens 326. It has been found that the use of transverse slots 340 allow the proximal sections 330a to expand to a greater degree than the sections 330b. Thus, the slots 340 have been found to minimize any reduction in gripping pressure applied to the lens 326 and ferrule 348 by sections 330b due to expansion of the proximal sections 330a and/or the distal sections 330c.

As with the previous embodiments, the illustrated construction of the insert assembly 312 preferably positions the lenses 326 longitudinally relative to the fiber openings and fibers so that each lens properly de-focuses light transmitted from the fiber end or focuses light transmitted into the fiber end. The illustrated insert construction, including the alignment sleeves 330, preferably positions the lenses 326 into axial alignment with corresponding fiber openings and fibers of the cable assembly 304.

Furthermore, the connector assemblies 306,308 preferably have lens arrangements that are designed to transmit and receive a collimated light beam with a predetermined beam diameter. For instance, GRIN lenses 326 are preferably designed to receive the collimated light beam with the predetermined beam diameter from the corresponding ball lens 316 and focus the light beam onto the adjacent fiber end. Similarly, GRIN lenses 326 are preferably designed to receive a light beam from the adjacent fiber end and collimate the light beam so as to produce the predetermined beam diameter. Thus, the ball lenses 316 can receive and focus the collimated light beam from the GRIN lenses 326.

Figure 15:
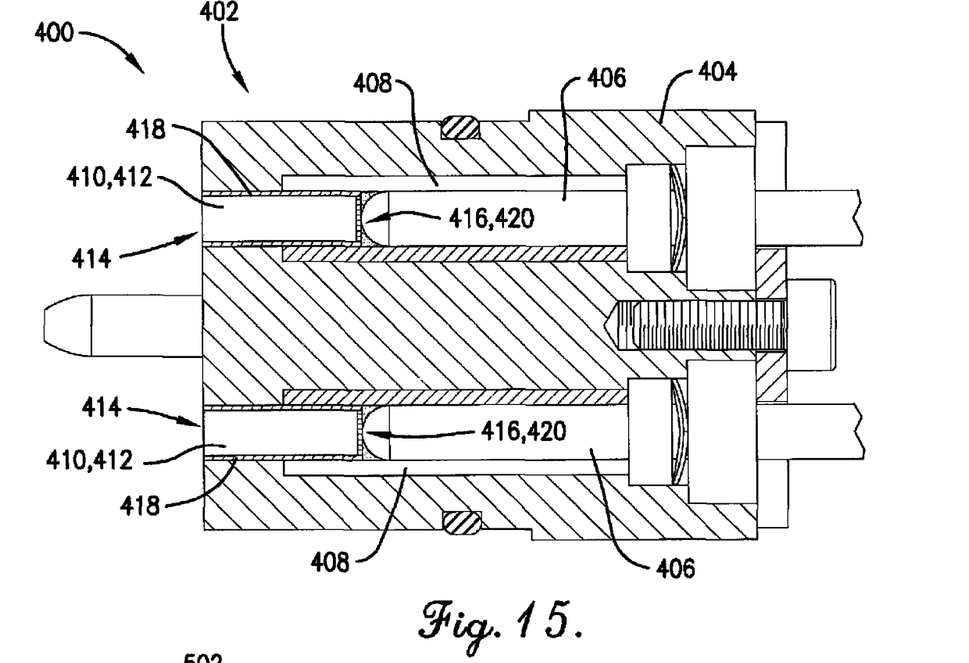
FIG. 15 is a fragmentary cross section of a connectable cable assembly constructed in accordance with a fourth embodiment of the present invention, showing an insert assembly including, among other things, a housing and a pair of alternative GRIN lenses secured in the housing, with each GRIN lens including a lens element that presents proximal and distal end faces, and with each distal end face being etched to form a diffractive optical element.
Figure 17:
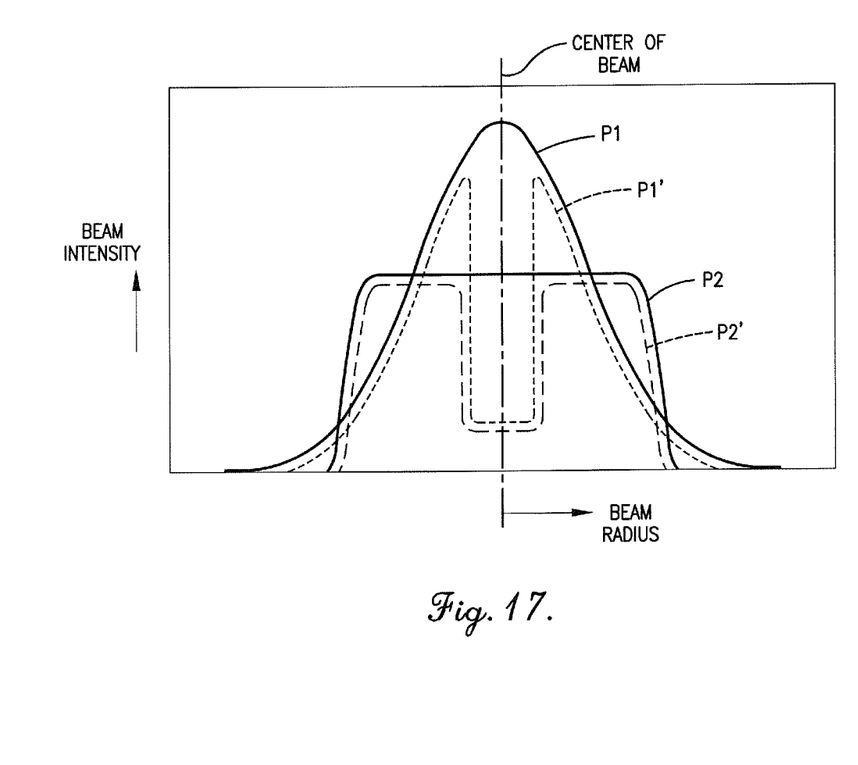
FIG. 17 is a schematic chart depicting an input light intensity profile of a light beam, prior to passing the light beam through one of the diffractive optical elements shown in FIG. 15, an output light intensity profile of the light beam after the inputted light beam passes through the diffractive optical element, a distorted input light intensity profile of the light beam produced by positioning of a contaminant fragment in the inputted light beam, and a distorted output light intensity profile of the light beam produced by positioning of the contaminant fragment in the outputted light beam.

Turning to FIGS. 15 and 17, an alternative connectable cable assembly 400 is constructed in accordance with a fourth embodiment of the present invention. The connectable cable assembly 400 is similar to cable assembly 200, but includes an alternative insert assembly 402. The alternative insert assembly 402 includes an insert housing 404, optical ferrule connectors 406, alignment sleeves 408, and alternative GRIN lenses 410.

The GRIN lenses 410 each include a lens element 412 that presents proximal and distal end faces 414,416 and a metallic layer 418. The lenses 410 are preferably secured and positioned so that a proximal face thereof is substantially flush with the proximal face of the insert body. As with the previous embodiments, the lenses 410 are held in place by attaching (e.g., by soldering or adhering) the lens to the insert body.

Each of the illustrated distal end faces 416 is preferably etched to define a diffractive optical element (DOE) 420. The DOE 420 is operable to transform an intensity profile of a light beam (not shown) passing therethrough. For instance, the illustrated DOE 420 is configured to receive a light beam having an input intensity profile P1, which is preferably in the form of a Gaussian intensity profile (see FIG. 17). The DOE 420 is operable to transform the light beam so that the beam has an output intensity profile P2, which preferably includes a region of substantially constant light intensity, although such region could have a slightly humped shape. The DOE 420 is preferably a beam transformer device that is laser etched or otherwise written into the lens using conventional techniques. However, for some aspects of the present invention, the DOE 420 could comprise an alternative DOE device, such as a beam diffuser. A suitable etched lens can be provided by RPC Photonics, Inc. of Rochester, N.Y. While the insert assembly 402 preferably includes the DOE 420, an alternative type of transmissive optical element, such as a micro lens array, could also be employed.

The DOE 420 preferably shapes the output intensity profile P2 so that the light beam is generally more resistant to signal loss/distortion due to contamination. For example, for a light beam with a beam diameter dimension of four hundred (400) micron and profile P1, a contaminant fragment, with a diameter dimension of about forty (40) micron, positioned in the path of the beam would produce a distorted input profile P1'. However, for a light beam with the beam diameter dimension of four hundred (400) micron and profile P2, the same contaminant fragment positioned in the path of the beam would produce a distorted profile P2'. Thus, it has been found that the illustrated intensity profile P2 provides improved connector performance compared to profile P1, in at least some instances.

Each of the illustrated DOEs 420 is preferably used in combination with the respective GRIN lens 410 so that the insert assembly 402 can transmit collimated light beams and control the intensity profile of each light beam. For some aspects of the present invention, the insert assembly 402 could employ a diffractive optical element for shaping the light beam without using a GRIN lens to transmit the beam.

Figure 16:
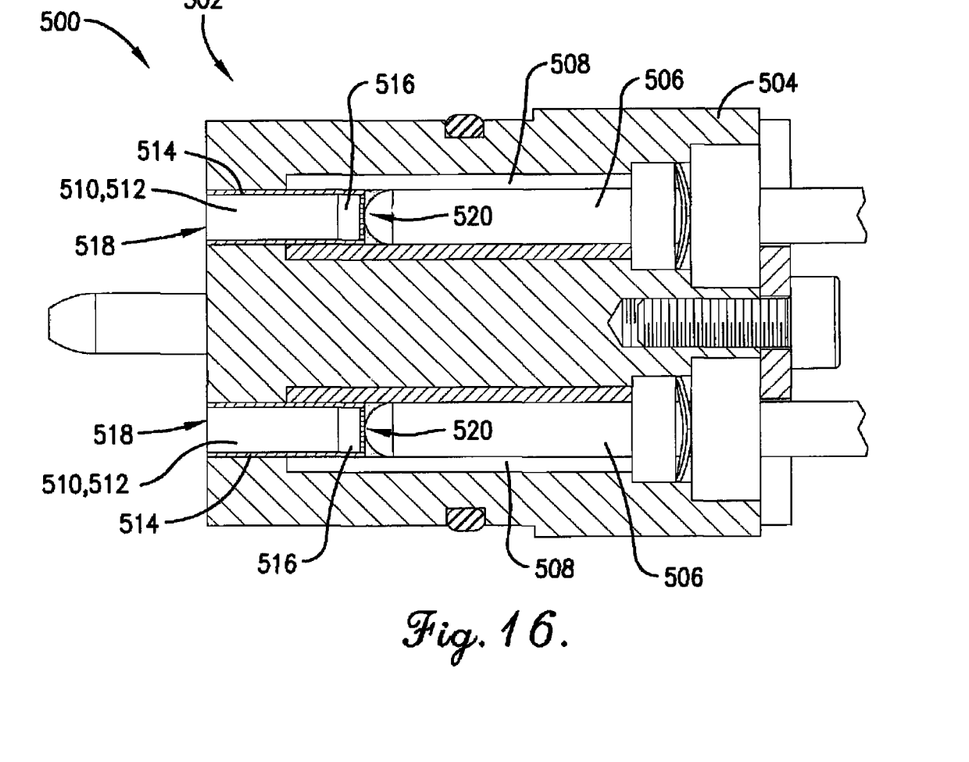
FIG. 16 is a fragmentary cross section of a connectable cable assembly constructed in accordance with a fifth embodiment of the present invention, showing an insert assembly including, among other things, a housing and a pair of alternative GRIN lenses secured in the housing, with each GRIN lens including a GRIN lens element and a rod lens that are positioned end-to-end, with the rod lens presenting a distal end face that is etched to form a diffractive optical element.

Turning to FIG. 16, an alternative connectable cable assembly 500 is constructed in accordance with a fourth embodiment of the present invention. The connectable cable assembly 500 is similar to cable assembly 400, but includes an alternative insert assembly 502. The alternative insert assembly 502 includes an insert housing 504, optical ferrule connectors 506, alignment sleeves 508, and alternative GRIN lenses 510.

The GRIN lenses 510 each include a cylindrical GRIN lens element 512 and a metallic layer 514. Each GRIN lens 510 also includes a cylindrical rod lens 516 that abuts the lens element 514 and is also surrounded by the metallic layer 516. The lens element 514 and rod lens 516 present respective proximal and distal end faces 518,520 of the GRIN lens 510. The lenses 510 are preferably secured and positioned so that the proximal face is substantially flush with the proximal face of the insert body. As with the previous embodiments, the lenses 510 are held in place by attaching the lens to the insert body.

Each of the illustrated distal end faces 520, presented by the corresponding rod lens 516, is preferably etched to define a diffractive optical element (DOE) 522. The DOE 522 is operable to transform an intensity profile of a light beam (not shown) passing therethrough.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An expanded beam optical connector operable to receive multiple terminated optical fibers, said connector comprising:

a housing presenting a passage that extends through the housing;

an optical ferrule including an end-face and multiple fiber openings that intersect the end-face and are operable to receive respective fiber ends of the multiple terminated optical fibers, said optical ferrule being mounted in the passage; and a plurality of GRIN lenses mounted in the passage, said plurality of GRIN lenses being substantially axially aligned with corresponding fiber openings so that the plurality of GRIN lenses and corresponding optical fibers are configured to be in optical communication with one another, said plurality of GRIN lenses being in abutting engagement with the end-face, at least one of the GRIN lenses presenting an outer lens surface; and at least one endless sealing device including a metallic layer applied to the outer lens surface, said metallic layer being soldered to the housing in sealing engagement therewith.

2. The expanded beam optical connector as claimed in claim 1, said end-face being elongated and extending between opposite end margins thereof, said fiber openings being spaced from one another along a length direction of the end-face, said plurality of GRIN lenses being positioned alongside one another in the housing and axially aligned with corresponding ones of the fiber openings.

3. The expanded beam optical connector as claimed in claim 2, said fiber openings being uniformly spaced along the length direction so that each pair of adjacent fiber openings define a center-to-center spacing dimension, each of said plurality of GRIN lenses presenting a lens diameter dimension, said lens diameter dimension being greater than the center-to-center spacing dimension.

4. The expanded beam optical connector as claimed in claim 1, said GRIN lenses each presenting lens ends and a respective outer lens surface that extends between the ends, with the outer lens surfaces of the GRIN lenses including the first-mentioned outer lens surface; and said at least one endless sealing device comprising multiple endless sealing devices that each extend around and sealingly engage a corresponding outer lens surface, said multiple endless sealing devices being positioned within the passage and in sealing engagement with the housing, with each endless sealing device thereby providing a substantially hermetic seal between the corresponding GRIN lens and housing.

5. The expanded beam optical connector as claimed in claim 1, said metallic layer including a material selected from the group consisting of gold, silver, and indium alloy.

6. The expanded beam optical connector as claimed in claim 1; and another optical ferrule presenting another end-face and a plurality of fiber openings that intersect the another end-face and are operable to receive respective fiber ends of the multiple terminated optical fibers, said another optical ferrule being mounted in the passage, said plurality of GRIN lenses being substantially axially aligned with corresponding fiber openings so that the plurality of GRIN lenses and corresponding optical fibers are in optical communication with one another, said plurality of GRIN lenses being in abutting engagement with respective end-faces.

7. The expanded beam optical connector as claimed in claim 1; and a resilient element received by the housing, said resilient element urging the ferrule into abutting engagement with the housing containing the plurality of GRIN lenses.

8. An expanded beam optical connector operable to receive multiple terminated optical fibers, said connector comprising:

a housing presenting a passage that extends through the housing;

an optical ferrule including an endface and multiple fiber openings that intersect the end-face and are operable to receive respective fiber ends of the multiple terminated optical fibers, said optical ferrule being mounted in the passage; and a plurality of GRIN lenses mounted in the passage, said plurality of GRIN lenses being substantially axially aligned with corresponding fiber openings so that the plurality of GRIN lenses and corresponding optical fibers are configured to be in optical communication with one another, said plurality of GRIN lenses being in abutting engagement with the end-face; and at least one diffractive optical element operable to transform an intensity profile of a light beam passing through at least one of the GRIN lenses.

9. The expanded beam optical connector as claimed in claim 8, said at least one diffractive optical element being etched into a respective one of the GRIN lenses.

10. The expanded beam optical connector as claimed in claim 9, said GRIN lenses each presenting opposite lens ends, each of said GRIN lenses having the at least one diffractive optical element etched on one of the lens ends.

11. The expanded beam optical connector as claimed in claim 8, said optical ferrule being removably mounted in the passage.

* * * * *